United States Patent [19]

Convis et al.

[11] Patent Number: 4,550,438
[45] Date of Patent: Oct. 29, 1985

[54] RETRO-STROKE COMPRESSION AND IMAGE GENERATION OF SCRIPT AND GRAPHIC DATA EMPLOYING AN INFORMATION PROCESSING SYSTEM

[75] Inventors: Danny B. Convis, Washington Grove; Paul J. Grimm, Clarksburg; Martin A. Reed, Rockville, all of Md.

[73] Assignee: International Business Machines Corporation, Armonk, N.Y.

[21] Appl. No.: 393,281

[22] Filed: Jun. 29, 1982

[51] Int. Cl.$^4$ ............................................. G06K 9/48
[52] U.S. Cl. ........................................ 382/56; 178/18; 340/706; 340/799; 382/22; 382/59
[58] Field of Search ....................... 364/200, 900, 518; 382/3, 13, 21, 22, 25, 56, 59; 358/260, 261–263; 178/18, 19; 340/706–708, 799; 250/202

[56] References Cited

U.S. PATENT DOCUMENTS

| | | | |
|---|---|---|---|
| 3,399,401 | 6/1964 | Ellis et al. | 340/324 |
| 3,732,557 | 5/1973 | Evans et al. | 340/324 R |
| 3,909,785 | 9/1975 | Howells | 382/13 |
| 3,999,167 | 12/1976 | Ito et al. | 340/172.5 |
| 4,181,956 | 1/1980 | Schwab et al. | 364/521 |
| 4,199,815 | 4/1980 | Kyte et al. | 382/56 |
| 4,361,830 | 11/1982 | Honma et al. | 382/22 |
| 4,375,654 | 3/1983 | Evans et al. | 358/260 |

OTHER PUBLICATIONS

Bertin, "Optical Data Compactor/Expander," *IBM Technical Disclosure Bulletin*, vol. 15, No. 3, 8/72, pp. 815–816.

*Primary Examiner*—Leo H. Boudreau
*Attorney, Agent, or Firm*—John W. Henderson, Jr.; Douglas H. Lefeve

[57] ABSTRACT

A method for compactly storing and reproducing script and graphic data from a computer input device. The computer input device sends a time sequence stream of x,y coordinates indicating graphic character locations on the input device. The first coordinate point of the graphic data is stored. Subsequent points are buffered until a reversal in the coordinate magnitude direction is detected with regard to either coordinate axis. This point is taken as a sample point and terminates a buffered segment and starts a new buffered segment. Each segment of the graphic character is approximated by a circular arc segment which is retained by storing the horizontal displacement to the mid-point of the arc segment along with the x and y displacements to the ending point of the segment. The retained information is sufficient to reproduce the input script or graphic for display, print, or manipulation. This is accomplished by mathematically regenerating the arc segments in the same sequence as they were originally created.

5 Claims, 13 Drawing Figures

RETRO-STROKE COMPRESSION AND IMAGE GENERATION OF SCRIPT AND GRAPHIC DATA EMPLOYING AN INFORMATION PROCESSING SYSTEM

TECHNICAL FIELD

The present invention relates to data compression techniques, and more particularly, to methods for compactly storing and recreating script and graphic data with the aid of a digital computer.

BACKGROUND ART

In an effort to increase the ease of use and efficiency of operation of digital computers, much work has been done in perfecting the man-machine interface. Graphic input tablets have been developed which allow the operator to input data directly into the digital computer by writing on the tablet with a pen or stylus while the stylus senses the x and y coordinates of the position of the stylus and inputs this data to the computer which can then store the data in the computer's electronic memory or reproduce the graphic input on a display device. One drawback of this kind of input device is that a large number of x and y coordinates must be stored by the computer in order to reproduce the graphic input with fidelity. Prior art systems have attempted to reduce this storage requirement by storing a starting point, a slope for a line and a length of the line. For example, U.S. Pat. No. 4,181,596 issued 1 Jan. 1980 to C. E. Schwab, et al discloses such a technique. The problem with this storage technique is that the fidelity of the image reproduced by the digital computer is limited since it can only reproduce straight line segments. While the fidelity of this reproduction can be improved by using many short line segments, this defeats the concept of compressing the data by requiring many more storage points. Nowhere in the prior art is a technique for highly compressing non-linear graphic input data and reproducing high fidelity images of the data disclosed.

DISCLOSURE OF THE INVENTION

A method is provided for compactly storing and faithfully reproducing script and graphic time series data from a computer tablet or optical scanner input device. The input device sends a time sequenced stream of x and y coordinates indicating the location of the data as it moves across the tablet. The beginning character point is stored. Subsequent points are buffered until a reversal in direction is detected with regard to either coordinate axis. This point, called the retro-coordinate sample point, terminates a buffered segment and starts a new buffered segment. The ending character point terminates the last segment of the stroke. Each segment is approximated by a circular arc which is retained by storing the horizontal displacement to the mid-point of the arc along with the x and y displacements to the ending retro-coordinate sample point. The retained information is sufficient to reproduce the input script or graphic for display, print or manipulation. This is accomplished by mathematically regenerating the arc segments in the sequence they were created.

BEST MODE FOR CARRYING OUT THE INVENTION

Figure 1:
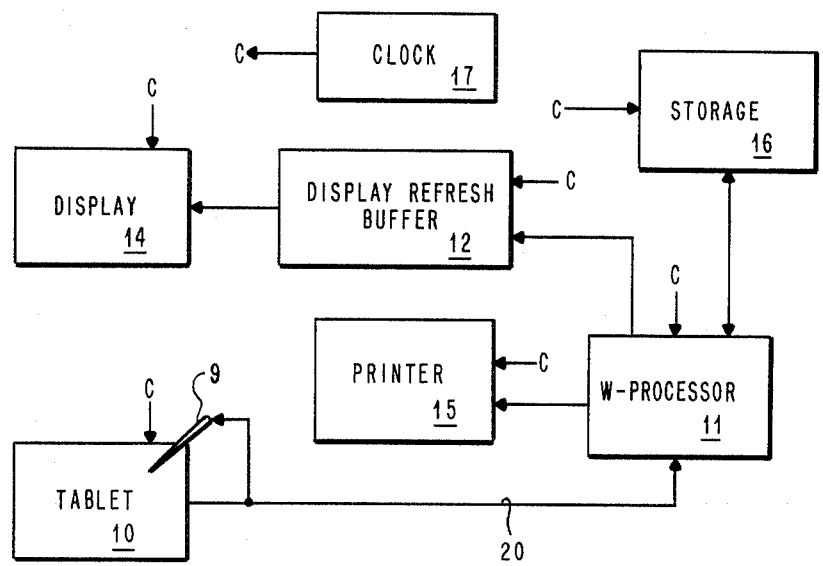
FIG. 1 is a block diagram of an interactive information processing system embodying the present invention.

The invention will now be described as embodied in an interactive information processing system of the type shown in FIG. 1. As shown in FIG. 1, the information processing system illustrated therein comprises a graphic input tablet 10, a microprocessor 11, a display refresh buffer 12, a display device 14, a printer 15, and an auxiliary direct access storage device 16 such as a disk drive. A clock 17, for keeping the various components of the system in synchronism, is also shown in FIG. 1 and is effectively coupled to each of the units.

Tablet 10 comprises a flat writing surface on which paper, film, etc., may be placed and then traced to input data to the microprocessor 11. Tracing or writing on the tablet 10 is done with pen 9 which is electrically coupled to the tablet 10. Graphic input tablets of the type referred to herein are commercially available, for example, the demi-pad 5 TM manufactured by GTCO Corporation or the TEKTRONIX® 4953/4954 Graphics Tablet manufactured by Tektronix, Inc. could be used.

Figure 2:
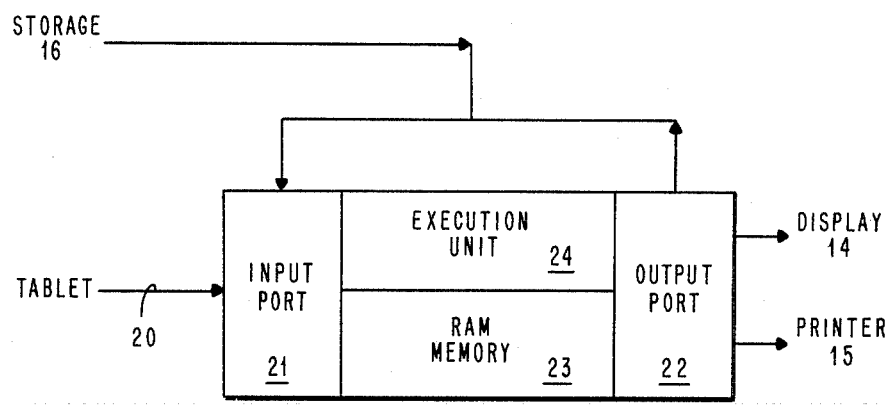
FIG. 2 is a functional diagram of the microprocessor shown in FIG. 1.

The tablet 10 is connected to the microprocessor 11 by means of a bus 20. The microprocessor 11, as shown in FIG. 2, comprises an input port 21, an output port 22, a random access memory 23, and a process execution unit 24.

Figure 3:
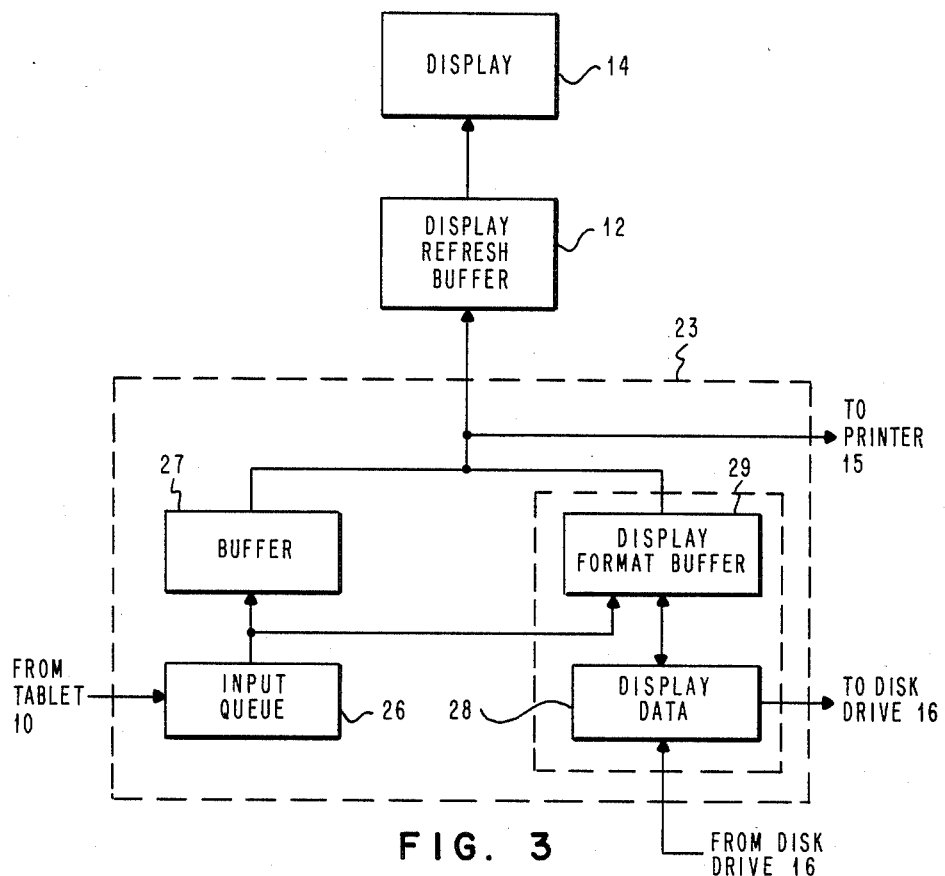
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the tablet 10 as pairs of x-y coordinates through input port 21. As shown in FIG. 3, the section of RAM 23 which received the data from the tablet 10 is designated input queue 26. Data to be displayed is transferred by a series of instructions from queue 26 to the buffer section 27 and then to the display refresh buffer 12 through output port 22 of the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the electron beam to cause selected phosphorus dots to illuminate on the display screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the tablet 10 or a conventional keyboard (not shown) attached to the microprocessor 11.

Printer 15 may be any suitable printer known in the art. For example, the printer may be a standard dot matrix output printer such as a wire matrix or ink jet or x-y plotter.

Dish storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. The other section of memory 23 shown in FIG. 3 is the display format buffer area 29 which is involved in the handling of spatially related data in decoded form.

Figure 4:
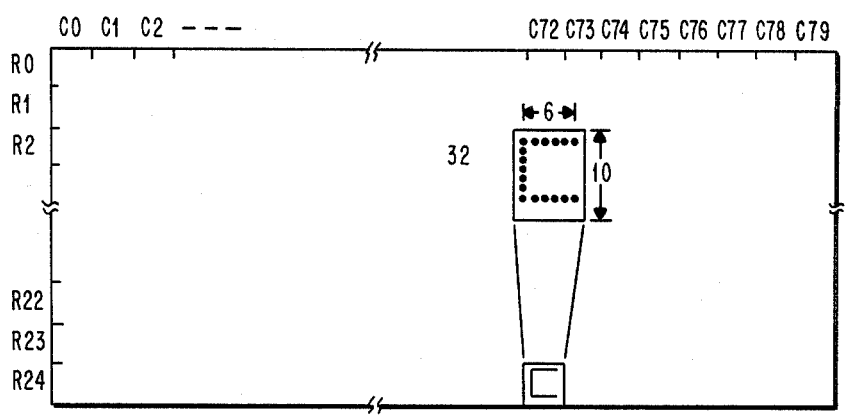
FIG. 4 is a diagrammatic view of the display shown in FIG. 1.

FIG. 4 is a schematic representation of the screen of display device 14. As shown in FIG. 4, the screen has, for example, the capability of displaying a matrix of dots in rows and columns to represent information input to the display. In practice, characters consist of a string of dot positions or picture elements sometimes referred to as pels. A character is represented on device 14 as a string of six wide by ten high pels, for example, which has been designated by reference character 32 in FIG. 4. The interaction of the refresh buffer 12 and the display 14 is to convert the data stored at a location in the buffer 12 to the corresponding character on the screen; this is accomplished by addressing the appropriate dots or pels on the screen in what is commonly called an all points addressable function. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the tablet 10 or interrupt signals generated by the various components of the system shown in FIG. 1.

The graphic input tablet 10 produces a stream of x,y pairs which identify the location of the pen 9 as it moves on the tablet 10. The input stream of coordinates is compressed by the present invention by selecting retro-coordinate sample (RCS) transition points which segment each stroke of the pen 9 into arcs. Each such arc is then approximated by a circular arc. This approximation is captured by computing and saving the x axis displacement (called delta-d) to the arc mid-point.

TABLE 1

RETRO COORDINATE SAMPLE DETECTION ALGORITHM
COMPUTE QUALIFYING RCS POINTS
DEFINITIONS:

| | |
|---|---|
| XY = | IMMEDIATE X OR Y COORDINATE POINT OF THE X,Y PAIR |
| LASTXY = | LAST X OR LAST Y COORDINATE POINT OF THE X,Y PAIR |
| DELTXY = | LAST RCS = X OR Y COORDINATE POINT OF THE X,Y PAIR |
| LAST SIGN = | SIGN OF LAST X AND LAST Y COORDINATE X,Y PAIR |

IF PEN-DOWN IS DETECTED THEN
SAVE LAST PEN_UP AS RCS POINT
SAVE THE PEN DOWN POSITION AS AN RCS POINT
COMPUTE WINDOW LIMIT FOR EXCLUSION OF RCS POINTS
GET THE HEIGHT OF THE ARC
STORE THE ARC LIFT (DX)
SET LASTXY TO PEN DOWN POSITION
INITIALIZE DIRECTION = SIGN (X(2) − X(1))
COMPUTE SIGN OF THE SLOPE FOR LAZY_S
ELSE (NOT PEN_DOWN SAMPLE)
DO FROM 2ND SAMPLE THRU PEN_UP
DO FOR BOTH X AND Y COORDINATES
GET XY SAMPLE
COMPUTE DIRECTION
COMPUTE DELTXY (LAST RCS − XY)
COMPUTE 2ND DERIVATIVE AND HOLD SIGN FOR XY SAMPLE
IF (DIRECTION CHANGED FROM LAST DIRECTION) THEN
IF THIS RCS CANDIDATE SAMPLE IS IN WINDOW LIMIT THEN
DO NOT FILE THIS SAMPLE AS AN RCS POINT
ELSE
SAVE LASTXY AS AN RCS POINT
COMPUTE WINDOW LIMIT FOR EXCLUSION OF RCS POINTS
LASTSIGN=SIGN SAVE DERIVATIVE SIGN
GET THE HEIGHT OF THE ARC
STORE THE ARC LIFT (DX)
ENDIF
ELSE (MOVEMENT IN SAME DIRECTION)
IF SIGN = LASTSIGN OR DELTXY > 126 THEN
THE DERIVATIVE SIGN HAS CHANGED WHILE DIRECTION REMAINED THE SAME
SAVE LASTXY AN RCS POINT
GET THE HEIGHT OF THE ARC
STORE THE ARC LIFT (DX)
COMPUTE WINDOW LIMIT FOR EXCLUSION OF RCS POINTS
LASTSIGN=SIGN SAVE DERIVATIVE SIGN
ENDIF
ENDIF
ENDDO
SET LASTXY = LAST X OR LAST Y = Y
ENDDO
ENDIF
END RCS

Figure 5:
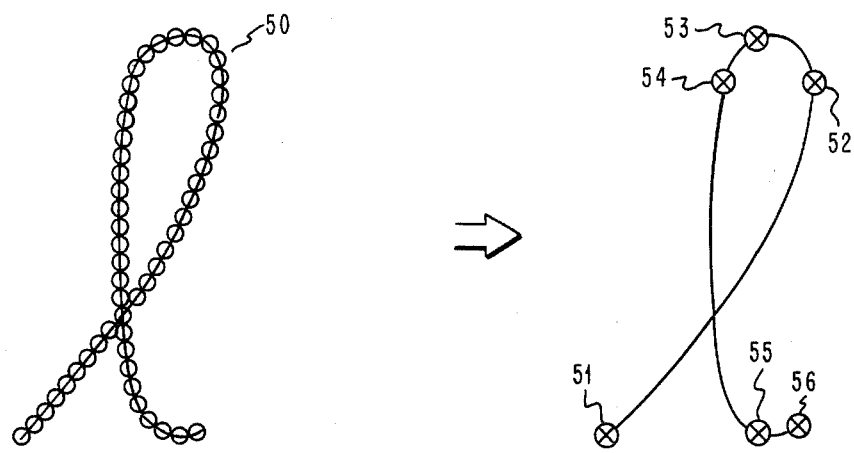
FIG. 5 illustrates the retro-coordinate sample points for a script character.

Referring now to FIG. 5, assume that a lowercase script 1 50 is written on the tablet 10. As the pen 9 moves the sample rate is constant and each small circle exemplifies the points sampled and thereby available for consideration by the RCS algorithm shown in Table 1. When the pen touches the tablet 10, point 51 will be the first RCS point saved. As the stroke progresses up and to the right, point 52 is the second RCS point saved as the x direction changes from right to left. The y axis movement continues its direction from bottom to top until at point 53 the direction now changes to a downward movement. At point 54 the x direction changes from a left to right movement, signalling that this point is to be saved. The y movement ceases its downward movement at point 55 and the final RCS point is generated at pen up point 56.

There are four conditions which applicants have discovered that produce an RCS point: (1) pen down and pen up, (2) reversal in direction of motion with respect to the x or y coordinates, (3) the delta x or delta y from the last selected RCS point exceeds a predetermined limit, for example, 126 grid units, and (4) the second derivative of the curve changes sign while within the constraints of the other three conditions. Conditions 1 and 2 are the primary RCS criteria. The addition of conditions 3 and 4 provide special coverage conditions and may be thought of as optional processes.

The pen down and pen up points are automatically picked as RCS points so the exact end points of each stroke are retained. As the pen motion proceeds from pen down (x(1), y(1)), each new point is examined to determine the direction of motion. When a change in direction is detected with respect to either axis, the transition point (x(s), y(s)) is saved as an RCS point. The following equation defines the relationship which generates an RCS point at x(i-1), y(i-1):

$$\text{sign } \frac{y(i) - y(i-1)}{x(i) - x(i-1)} \neq \text{sign } \frac{y(i-1) - y(i-2)}{x(i-1) - x(i-2)} \qquad \text{I}$$

To handle long strokes applicants' algorithm was designed to store an RCS point when 126 units have been traversed in any direction since the last RCS point. The default value of 126 units is a designer's choice based on eight bits being used to save the displacement between RCS points which permits a value of ±126 units.

Figure 6:
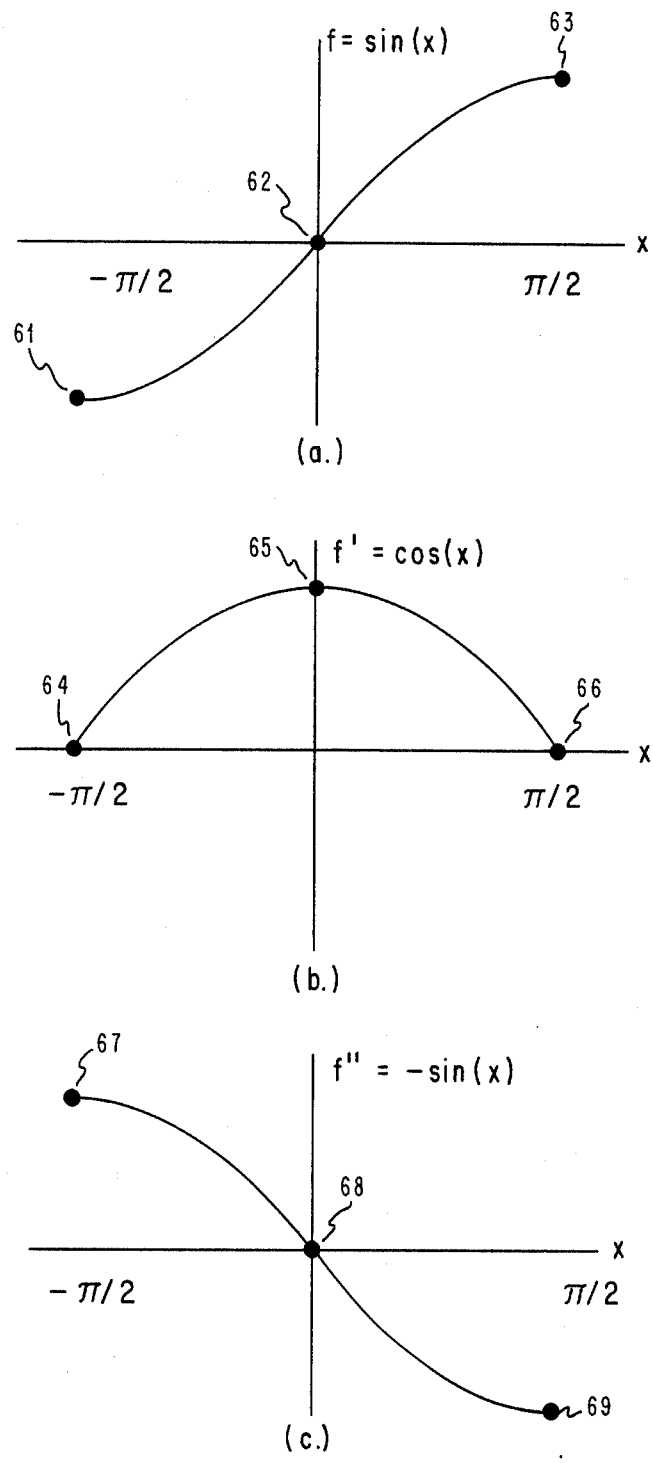
FIG. 6 illustrates a graphic figure with gradually changing curves.

The coverage provided by the above three conditions will address most of the cases for high quality image generation using the approach defined by the present invention. However, there exists the possibility for a principal to scribe in a manner that will not capture an RCS point. To cover such situations, a higher order point of change is defined. Refer to FIG. 6a which shows the graph of a sine wave between the x values $-\pi/2$ and $\pi/2$ radians representing a segment of an input stroke. Since the first derivative of this curve as shown in FIG. 6b changes sign at the points 64 and 66, only these points would be captured by the RCS logic as described by condition 2 above. Since the midpoint 62 is on a straight line connecting 61 and 63, this curve would be represented by a straight line. Point 62 in FIG. 6a is clearly a point of change which needs to be captured. Mathematically speaking, such a point is called an "inflection point", and is defined as a point where the second derivative of a continuous curve changes signs, i.e. where the curve changes from a concave to convex or convex to concave shape. FIG. 6c illustrates the second derivative of the sine wave. Point 68 occurs at the location where the second derivative changes signs from positive to negative and so is an inflection point that can be recognized. Letting x(i), y(i), i=1,2,3 ... represent the time sequenced coordinates of the sample points on a curve, this logic can be invoked as follows:
If, $$\text{sign } \frac{\frac{y(i) - y(i-1)}{x(i) - x(i-1)} - \frac{y(i-1) - y(i-2)}{x(i-1) - x(i-2)}}{x(i) - x(i-2)} \neq \qquad \text{II}$$

$$\text{sign } \frac{\frac{y(i-1) - y(i-2)}{x(i-1) - x(i-2)} - \frac{y(i-2) - y(i-3)}{x(i-2) - x(i-3)}}{x(i-1) - x(i-3)}$$

then an RCS point is generated at x(i-1), y(i-1). The name "lazy-s" for these points refers to the general shape of FIG. 6a, which is but one of the orientations where the capture of inflection points is significant. However, it should be noted that the capture of these points is not crucial to the overall effectiveness of the present invention. The quality of a complex image, where many RCS points are involved but the relatively few "lazy-s" points are neglected, is usually acceptable.

Figure 7:
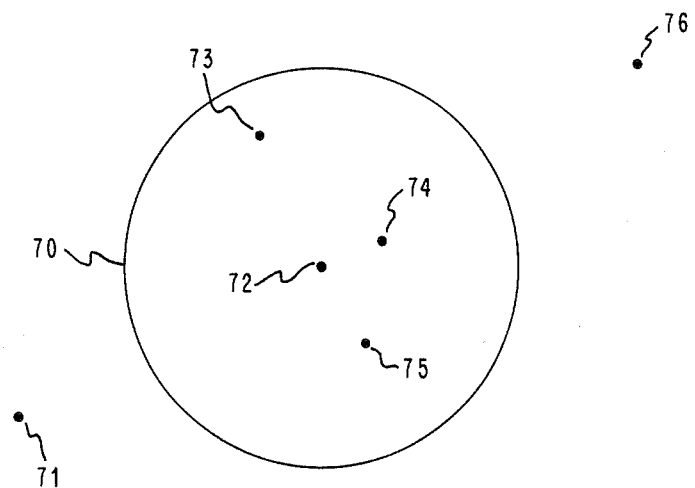
FIG. 7 is a graphic representation of a window surrounding a number of input points.

Since the input tablet 10 may not be an ideal device, more than one point may be generated as the location of the pen 9 as it moves across the tablet 10. It is desirable to have the path smooth so as not to generate extraneous RCS points. To assure this, the present invention computes a window based on the input and output device height and width maximums. This window is the basis for discarding otherwise unnecessary input points and improving overall compaction. FIG. 7 is a graphic representation of the window. Point 72 is the first entry within the window, therefore no other entry is allowable in the same sequence. Points 73, 74 and 75 are discarded due to the window constraint. Point 76 is the next allowable input point to be evaluated as an RCS point.

Figure 8:
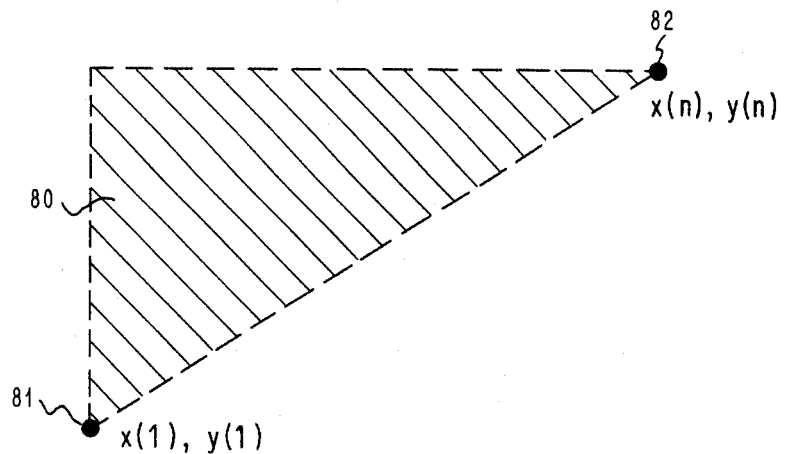
FIGS. 8 and 9 illustrate the bounds through which a curve will pass in accordance with the window of FIG. 7.
Figure 9:
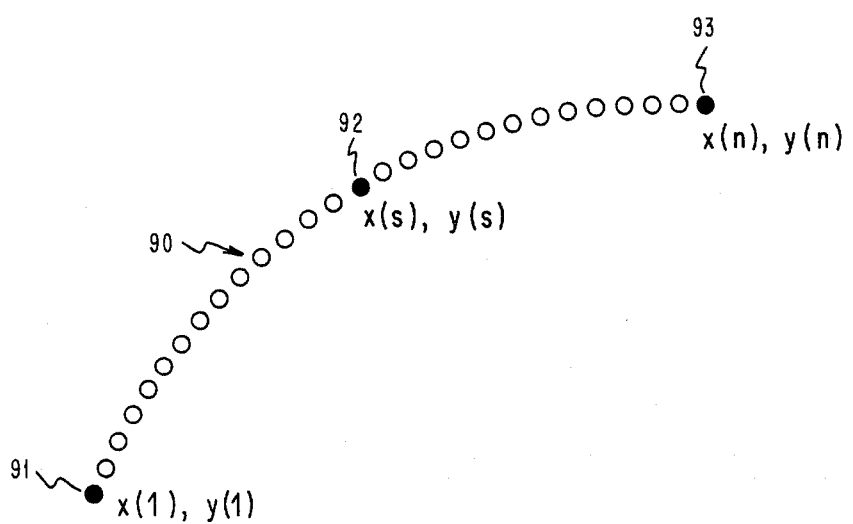
Figure 10:
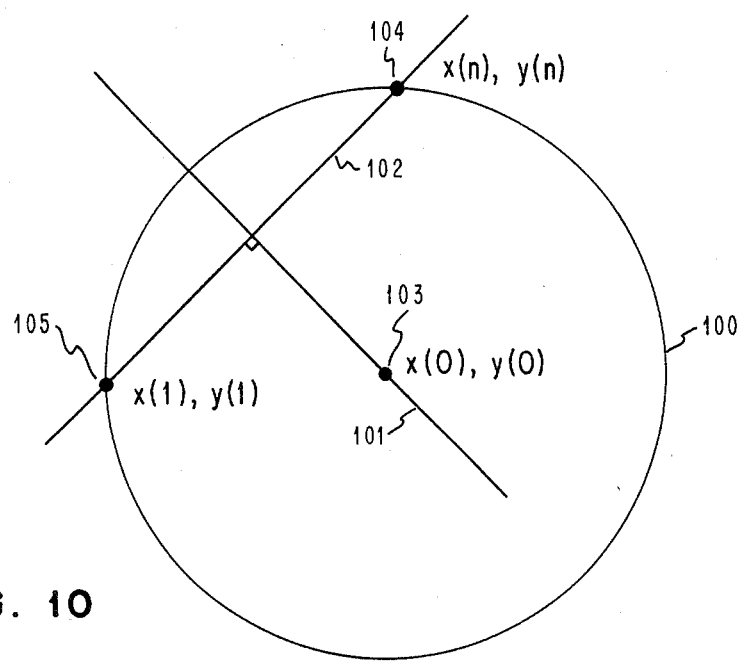
FIGS. 10 and 11 illustrate the trigometrical determination of the mid-point of a circular arc.

In order to compactly store and faithfully reproduce written input from the graphic input table 10 it is necessary to emulate the naturally smooth motions of a writer while storing as little information as possible. The circle was chosen as the approximating curve in order to achieve the most fundamental design which results in a very fast execution time when implemented as a computer program. Given two RCS endpoints defined by the coordinates x(1),y(1) and x(n),y(n) and the intermediate sampling points defined by the coordinates (x(2),y(2)), (x(3),y(3)), ..., (x(n-1),y(n-1)), the objective is to find a point x(d),y(d) that describes the circle being fit as an approximation to the curve between x(1),y(1) and x(n), y(n). Refer now to FIGS. 8 and 9. The shaded area 80 in FIG. 8 bounds the space through which a concave curve between the RCS points 81 and 82 can pass. FIG. 9 shows such a typical curve, where point 92 represents the coordinates of any of the intermediate sampling points. Referring now to FIG. 10, assume the two points x(1),y(1) and x(n),y(n) are on a circle 100, then the center 103 of the circle defined by the coordinates x(0),y(0) lies on the line 101 which bisects and is perpendicular to the line 102 between the two points 104 and 105. The line 102 is defined by equation III and line 101 is defined by equation IV.

$$y = \frac{y(n) - y(1)}{x(n) - x(1)} x + y(1) - \frac{y(n) - y(1)}{x(n) - x(1)} x(1) \qquad \text{III}$$

$$y = \frac{x(1) - x(n)}{y(n) - y(1)} x + \qquad \text{IV}$$

$$\frac{(y(n) - y(1))(y(n) + y(1)) + (x(n) - x(1))(x(n) + x(1))}{2(y(n) - y(1))}$$

The circle containing x(1),y(1) and x(n),y(n) can be uniquely defined by specifying one additional point on the circle. A convenient choice is the point where the line 101 intersects the circle 100, since only one coordinate (either x or y) of this point needs to be stored. The other coordinate can be recovered through equation IV. In addition, this point is a natural choice since it represents the maximum distance from the chord between x(1),y(1) and x(n),y(n) to the concave arc of the circle between these points. Thus, the point gives a measure of the maximum "bend" of the curve between the endpoints.

Figure 11:
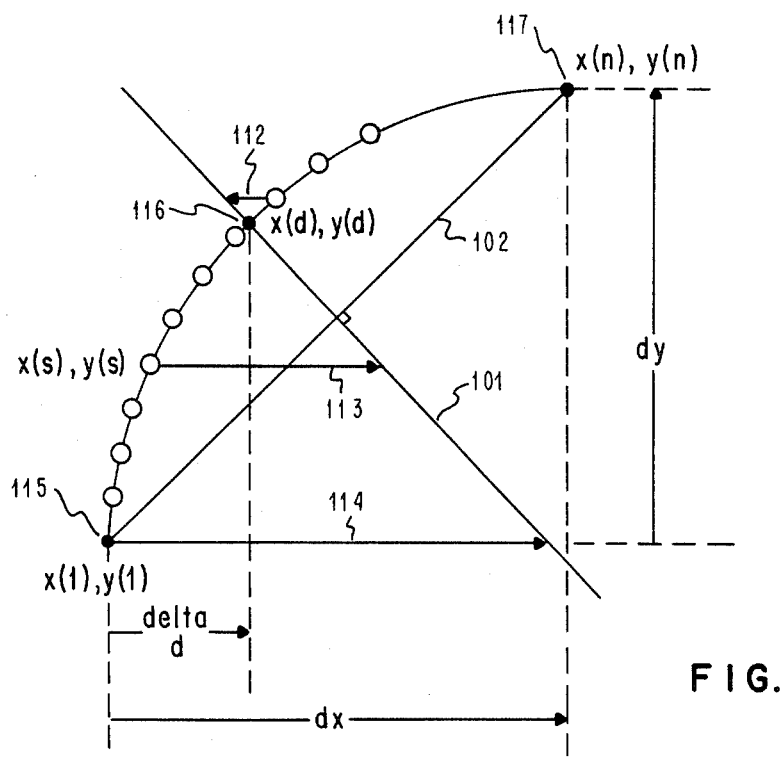

The technique for finding the point 116 defined by coordinates x(d),y(d) is shown in FIG. 11. A horizontal vector 114 is drawn from point 115 to the line 101. The value of the vector 114 is the x value of the intersection of vector 114 and the line 101. The sign of the vector 114 is the critical parameter. A similar horizontal vector 113 is then drawn from each sampled point x(s),y(s), until the point is found that touches or crosses the line 101, i.e., until vector 113 equals zero or changes sign. At this point a perpendicular projection is dropped to line 101 and this becomes the point x(d),y(d). The displacement x(d)-x(1) is stored as delta-d, completing the definition of the circle. Delta-d is defined by equation V.

$$\text{delta-d} = \frac{dx(x(1) + x(n) - 2X(s)) + dy(y(1) + y(n) - 2y(s))}{1 + (dy/dx)^{**}2} + x(s) - x(1) \quad \text{V}$$

where $dx = x(n) - x(1)$ and $dy = y(n) - y(1)$

The limiting case of the circle is a straight line. This geometry is indicated when there are no intermediate sampling points between x(1),y(1) and x(n),y(n). In addition, if dx equals zero or dy equals zero, a straight line is the only possible curve between the RCS points, as can be extrapolated from the bounds in FIG. 8. The algorithm for calculating delta-d covers this situation by setting delta-d equals dx/2. A major computational advantage to this algorithm is that only approximately half of the sampled points need be considered in the calculations to find delta-d. An example program routine for calculating delta-d is shown in Table 2 implemented in pseudo code.

TABLE 2

```
BEGIN DELTA-D SELECTION
GET THE N (X,Y) PAIRS OF COORDINATES BETWEEN
THE RCS POINTS
IF THE RCS POINTS SPAN A STRAIGHT LINE
THEN DELTA-D = (DELTA-X)/2
ELSE DO
T1 =       THE SIGN OF THE HORIZONTAL DISTANCE
           FROM THE
           FIRST RCS POINT TO THE PERPENDICU-
           LAR BISECTOR OF THE LINE BETWEEN
           THE RCS POINTS
DELTA-D = 0
DO I =     2 TO N WHILE (DELTA-D = 0)
T =        THE SIGN OF THE HORIZONTAL DISTANCE
           FROM THE
           ITH INTERMEDIATE POINT TO THE
           PERPENDICULAR BISECTOR OF THE
           LINE BETWEEN THE RCS POINTS
IF (T = 0) OR (T ≠ T1)
THEN COMPUTE DELTA-D AS A FUNCTION OF
T,X(I),Y(I)
ENDIF
ENDDO
ENDDO
ENDIF
OUTPUT DELTA-D
```

TABLE 2-continued

END DELTA-D SELECTION

In a mode for implementing the invention, the input from tablet 10 consists of first quadrant values for each x and y pair. The pen down position is indicated by affixing a minus sign to the x coordinate of this x,y pair. Storage for the input pairs is 16 bits per coordinate, thereby using 32 bits per x,y pair. The technique for RCS point storage uses the full 32 bits for the pen down x,y pair. Following the pen down x,y is the delta-d (d) for the first segment. This occupies eight bits. Finally another dx and dy pair follows the delta-d, each occupying eight bits. The dx and dy pair are the displacement from the original pen down x,y. These sequence of three 8-bit values (d, dx,dy) is repeated for each segment until the pen up RCS is detected. Every dx,dy after the pen down is the displacement from the preceding x,y. It must be remembered that the dx,dy is the terminal point for one arc and an initial point for the next arc in the sequence. A negative sign is used on the first x value to indicate pen down on the RCS points.

In order to reconstruct the stored image, the arc generation routine shown in Table 3 is invoked. The image is stored as a set of triplets (two adjacent RCS points plus the intermediate point represented by delta-d, where each triplet defines an arc or segment of the image.

TABLE 3

```
BEGIN ARC GENERATION
GET THE VALUES X(1),Y(1) (COORDINATES OF 1ST
RCS POINT)
DELTA-D (DISPLACEMENT TO THE INTERMEDIATE
POINT)
DELTA-X,DELTA-Y (DISPLACEMENT TO THE
SECOND RCS POINT)
AND N (THE NUMBER OF POINTS TO GENERATE ON
THE ARC)
IF DELTA-D = (DELTA-X)/2
THEN GENERATE POINTS ON A STRAIGHT LINE
BETWEEN THE RCS POINTS
ELSE DO
COMPUTE THE SECOND RCS POINT X(N),Y(N)
DETERMINE THE INTERMEDIATE POINT X(D),Y(D)
FROM DELTA-D
DETERMINE THE RADIUS OF THE CIRCLE TO BE
GENERATED (R)
DETERMINE THE CENTER POINT OF THE CIRCLE
(X(0),Y(0))
THETA-1 =    THE ANGLE BETWEEN A HORI-
             ZONTAL LINE AND THE LINE
             FROM THE CENTER OF THE CIR-
             CLE TO X(1),Y(1)
THETA-D =    THE ANGLE BETWEEN A HORI-
             ZONTAL LINE AND THE LINE
             FROM THE CENTER OF THE CIR-
             CLE TO X(D),Y(D)
THETA-N =    THE ANGLE BETWEEN A HORI-
             ZONTAL LINE AND THE LINE
             FROM THE CENTER OF THE CIR-
             CLE TO X(N),Y(N)
DELTA-THETA = ((THETA-N) - (THETA-1))/N-1
DO I = 2 TO N-1
GENERATE A POINT AT THE COORDINATES:
X(I) =       X(0) + R*COS(THETA-1 +
             (I-1) *DELTA-THETA)
Y(I) =       Y(0) + R*SIN(THETA-1 +
             (I-1) *DELTA-THETA)
ENDDO
ENDDO
ENDIF
OUTPUT THE N GENERATED POINTS ON THE ARC OF A
CIRCLE
```

TABLE 3-continued
END ARC GENERATION

The first RCS endpoint x(1),y(1) is equivalent to the second RCS endpoint of the previous arc. The second RCS endpoint x(n),y(n) is recovered by adding the stored dx and dy values to x(1) and y(1), respectively, i.e., $$x(n) = x(1) + dx \qquad \text{VI}$$

$$y(n) = y(1) + dy \qquad \text{VII}$$

The intermediate point on the arc x(d),y(d) is found from, $$x(d) = x(1) + \text{delta-}d \qquad \text{VIII}$$

$$y(d) = (-dx/dy)\,x(d) + \frac{dy(y(n) + y(1)) + dx(x(n) + x(1))}{2dy} \qquad \text{IX}$$

A circle is uniquely defined by these three points on its arc. From this information, the center and radius of the circle can be determined, thereby enabling the generation of additional points on the arc between x(1),y(1) and x(n),y(n).

Figure 12:
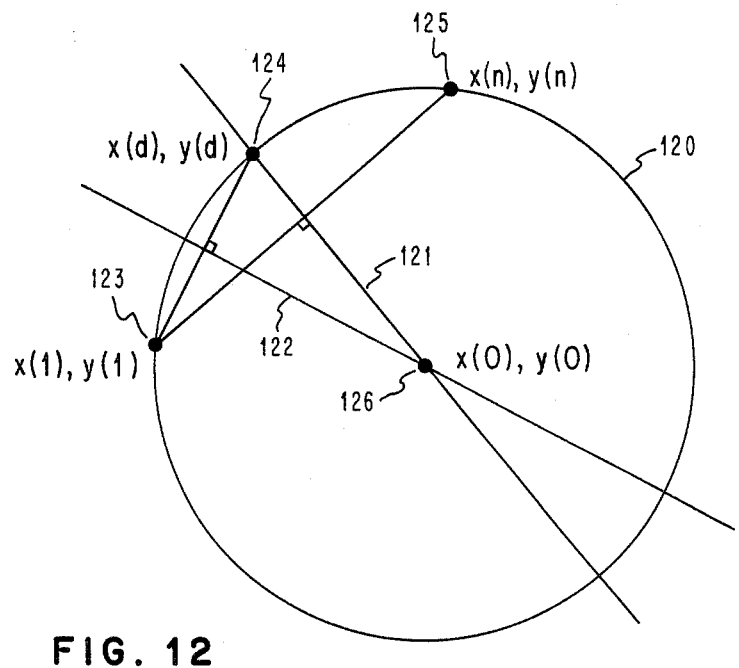
FIG. 12 illustrates the process for determining the center of a circular arc.

The simplest procedure for finding the center 126 of the circle 120 is by drawing perpendicular bisectors of the lines joining any two pairs of points on the circle, and then solving for the intersection of these bisecting lines. FIG. 12 illustrates the process. The equation for line 121 at x(0),y(0) is $$y(0) = (-dx/dy)\,x(0) + \frac{dy(y(n) + y(1)) + dx(x(n) + x(1))}{2dy} \qquad \text{X}$$

and the equation for line 122 at x(0),y(0) is $$y(0) = \frac{x(1) - x(d)}{y(d) - y(1)}\,x(0) + \frac{(y(d) - Y(1))(y(d) + y(1)) + (x(d) - x(1))(x(d) + x(1))}{2(y(d) - y(1))} \qquad \text{XI}$$

Solving for x(0), $$x(0) = \frac{\frac{(y(d) - y(1))(y(d) + y(1)) + (x(d) - x(1))(x(d) + x(1))}{2(y(d) - 6(1))} - B}{\frac{x(d) - x(1)}{y(d) - y(1)} - (dx/dy)} \quad \text{where } B = \frac{dy(y(n) + y(1)) + dx(x(n) + x(1))}{2dy} \qquad \text{XII}$$

y(0) is then found from either equation X or equation XI.

The radius R is the distance from the center of the circle to any point on the circle, $$R = SQRT((x(1) - x(0))^{}2 + (y(1) - y(0))^{}2) \qquad \text{XIII}$$

Figure 13:
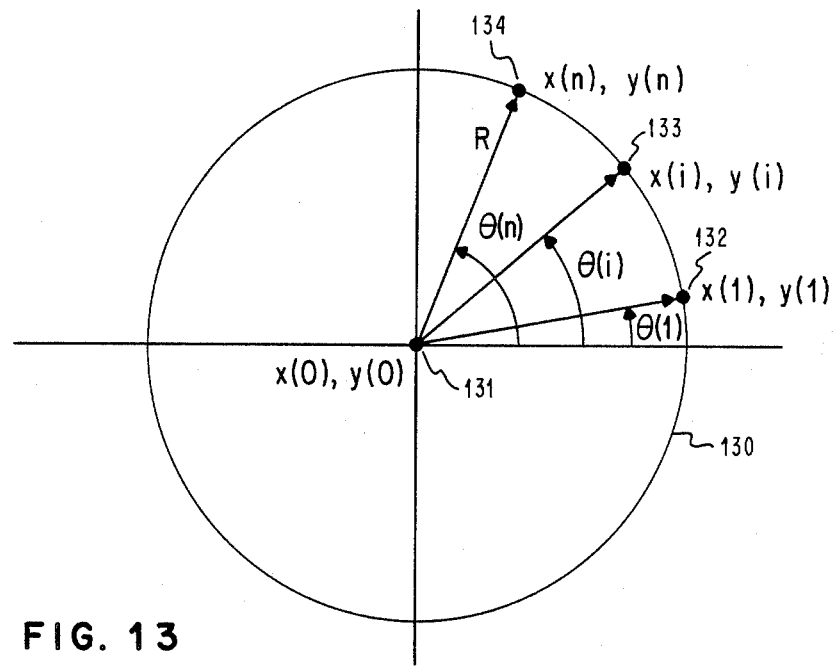
FIG. 13 illustrates the determination of a circular arc utilizing polar coordinates.

Assume now that n points are to be generated on the arc (including the endpoints x(1),y(1) and x(n),y(n)) and that these points are to define uniform sub-arcs. The use of polar coordinates is therefore indicated to facilitate this definition. FIG. 13 represents the concept. From FIG. 13, $$\theta(1) = \arctan \frac{y(1) - y(0)}{x(1) - x(0)} \qquad \text{XIV}$$

$$\theta(n) = \arctan \frac{y(n) - y(0)}{x(n) - x(0)} \qquad \text{XV}$$

The angle $\theta(i)$ of intermediate point x(i),y(i) is then, $$\theta(i) = \theta(1) + (i - 1)\frac{\theta(n) - \theta(1)}{n - 1} \quad i < n \qquad \text{XVI}$$

And so the cartesian coordinates of the intermediate point are, $$x(i) = x(0) + R\cos\theta(i) \qquad \text{XVII}$$

$$y(i) = y(0) + R\sin\theta(i) \qquad \text{XVIII}$$

By looping through equation XVI through XVIII, all intermediate points on the arc are generated.

While the invention has been particularly shown and described with respect to the preferred embodiment, it will be understood by those skilled in the art that various changes in form and detail may be made without departing from the spirit and scope of the invention.

We claim:

1. A method for storing a representation of graphic input data from a computer tablet utilizing a digital computer system comprising the steps of:
   (a) storing the x and y coordinates of the point at which the stylus of said computer tablet initially contacts said tablet;
   (b) temporarily buffering the x and y coordinates of each subsequent point as the stylus moves across the tables until a reversal in stylus direction is detected along either an x or y axis;
   (c) storing the x and y coordinates of the point at which the stylus reverses directions;
   (d) generating a circular arc segment approximating the stylus path between the initial contact point and the point of reversal of stylus direction;
   (e) storing the horizontal component of the mid-point of the circular arc segment; and
   (f) repeating steps (a) through (e) for each additional movement of the stylus.

2. A method for compactly storing a representation of graphical input data employing a digital computer system comprising the steps of:
   (a) scanning an input document as an array of rectangular x and y coordinate points;
   (b) storing the x and y coordinate points at which graphic data starts;
   (c) temporarily buffering the x and y coordinates of each subsequent point of the graphic data as the document is scanned;
   (d) analyzing the temporarily buffered coordinate points for a coordinate point at which the direction of said scanning reverses along either an x or y axis;
   (e) storing the change in coordinate point magnitudes from said coordinate point at which graphic data starts to the coordinate point at which the direction of said scanning reverses;

(f) generating a circular arc segment approximating the curve of the graphic data from said coordinate point at which said data starts to the coordinate point at which the direction of said scanning reverses;

(g) storing the horizontal component of the mid-point coordinate of the circular arc segment;

(h) storing the coordinate point at which the direction of said scanning reverses as said coordinate point at which graphic data starts; and (i) repeating steps (d) through (h) until the end of the temporarily buffered coordinate points is reached.

3. A system for compactly storing representations of graphical input data in a digital computer system comprising:

means for scanning an input document as an array of rectangular x and y coordinate points;

means for storing the x and y coordinate points at which the graphic data begins;

means for temporarily buffering the x and y coordinates of each subsequent point of the graphic data as the document is scanned;

means for analyzing the temporarily buffered coordinate points for a coordinate point at which the direction of said scanning reverses along either an x or y axis;

means for storing the change in coordinate point magnitudes from said coordinate point at which graphic data begins to the coordinate point at which the direction of said scanning reverses;

means for generating a circular arc segment approximating the curve of the graphic data from said coordinate point at which said graphic data begins to the coordinate point at which the direction of said scanning reverses;

means for storing the horizontal component of the midpoint coordinate of the circular arc segment; and means for storing the coordinate point at which the direction of said scanning reverses as said coordinate point at which graphic data begins.

4. The system of claim 3 wherein said means for scanning is a computer tablet.

5. A system for storing a representation of graphic input data from a computer tablet in a digital computer system comprising:

means for storing the x and y coordinates of the point at which the stylus of said computer tablet initially contacts said tablet;

means for temporarily buffering the x and y coordinates of each subsequent point as the stylus moves across the tables until a reversal in direction of said stylus is detected along either an x or y axis;

means for storing the x and y coordinates of the point at which the stylus reverses directions;

means for generating a circular arc segment approximating the stylus path between the initial contact point and the point of stylus reversal of direction; and means for storing the horizontal component of the midpoint of the circular arc segment.

* * * * *